May 28, 1946.    J. R. ROBERTS    2,401,020
DUPLICATING MACHINE
Filed Aug. 21, 1942    7 Sheets-Sheet 1

INVENTOR.
John R. Roberts.
BY Zabel, Carlson, Fritzbaugh & Wells
Attys.

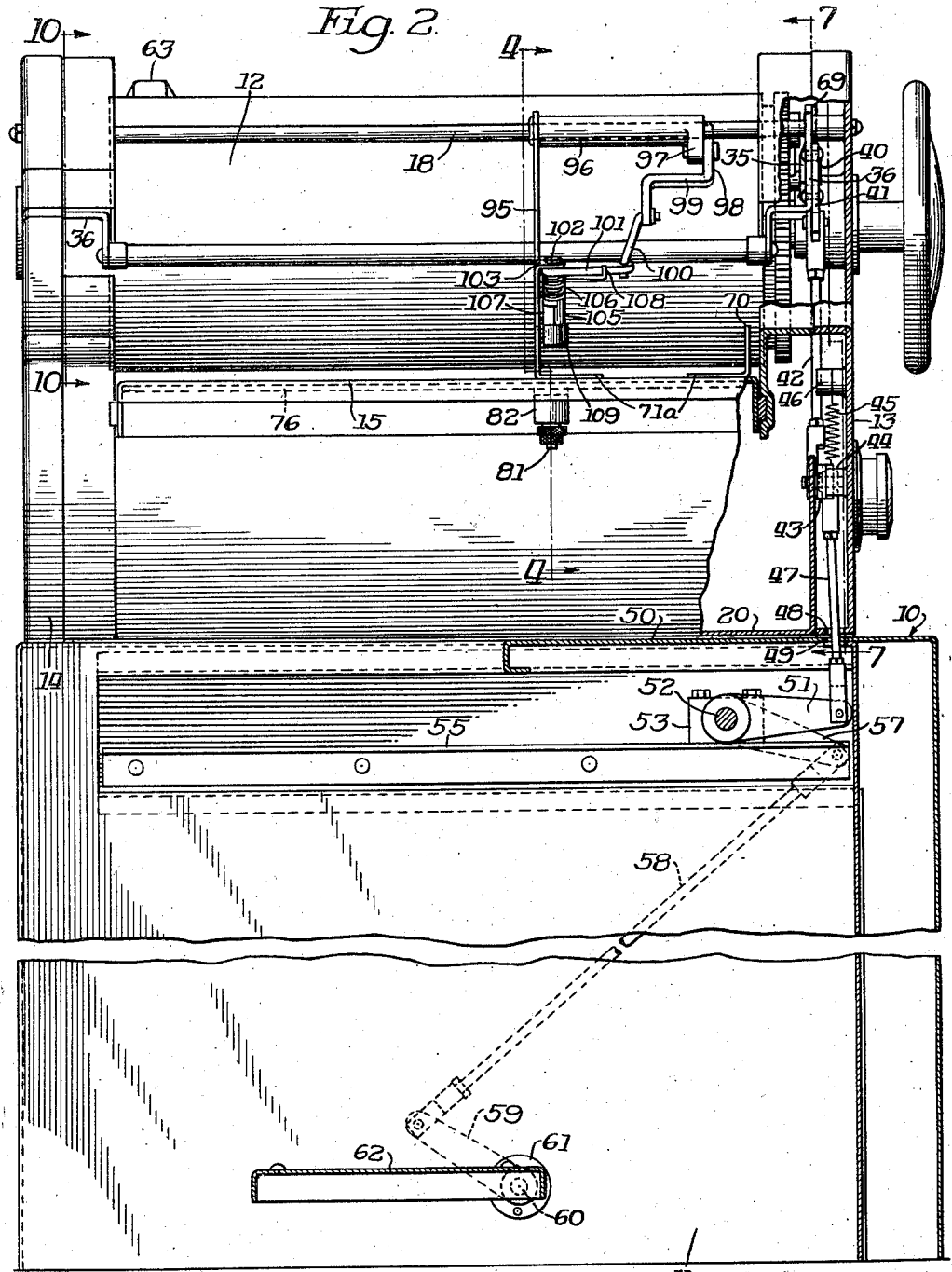

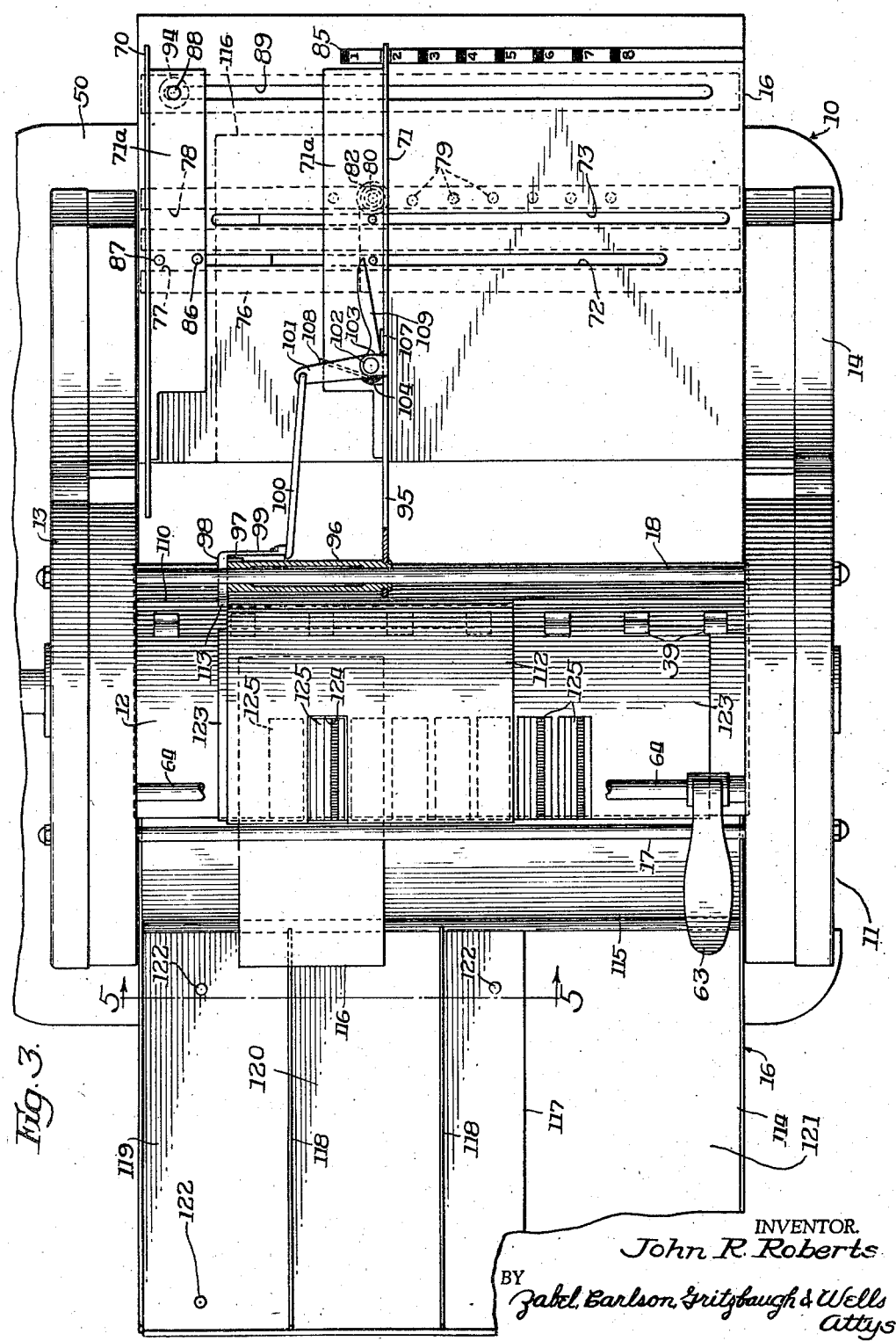

May 28, 1946. J. R. ROBERTS 2,401,020
DUPLICATING MACHINE
Filed Aug. 21, 1942 7 Sheets-Sheet 4
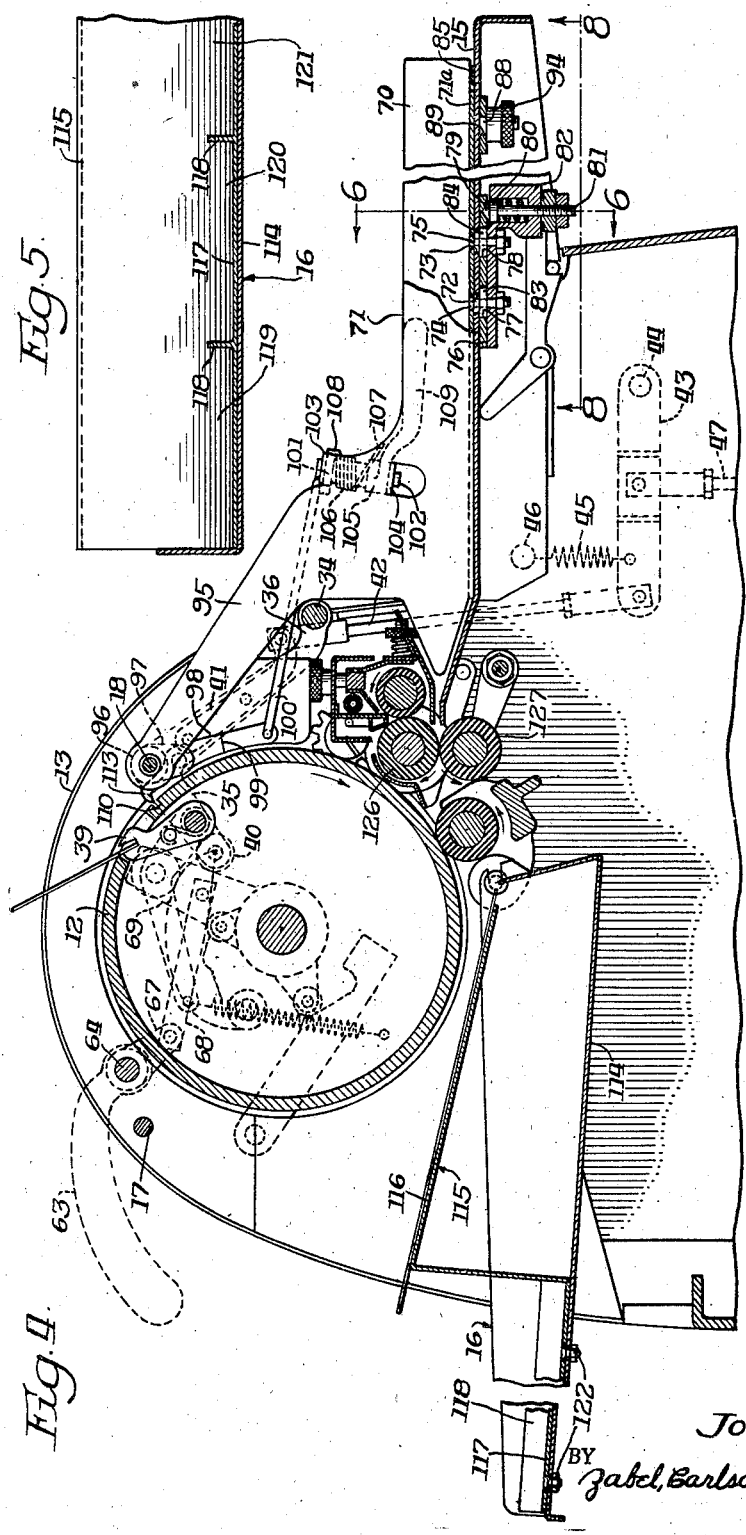
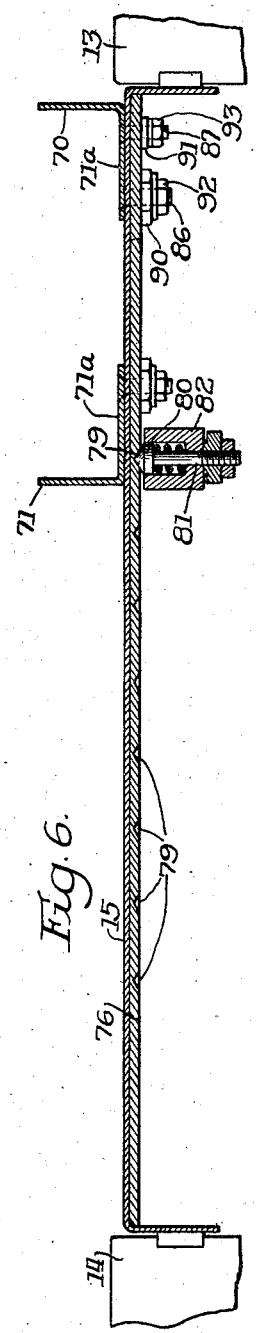
INVENTOR.
John R. Roberts
BY Zabel, Carlson, Fritzbaugh & Wells
attys.

May 28, 1946.  J. R. ROBERTS  2,401,020
DUPLICATING MACHINE
Filed Aug. 21, 1942  7 Sheets-Sheet 5
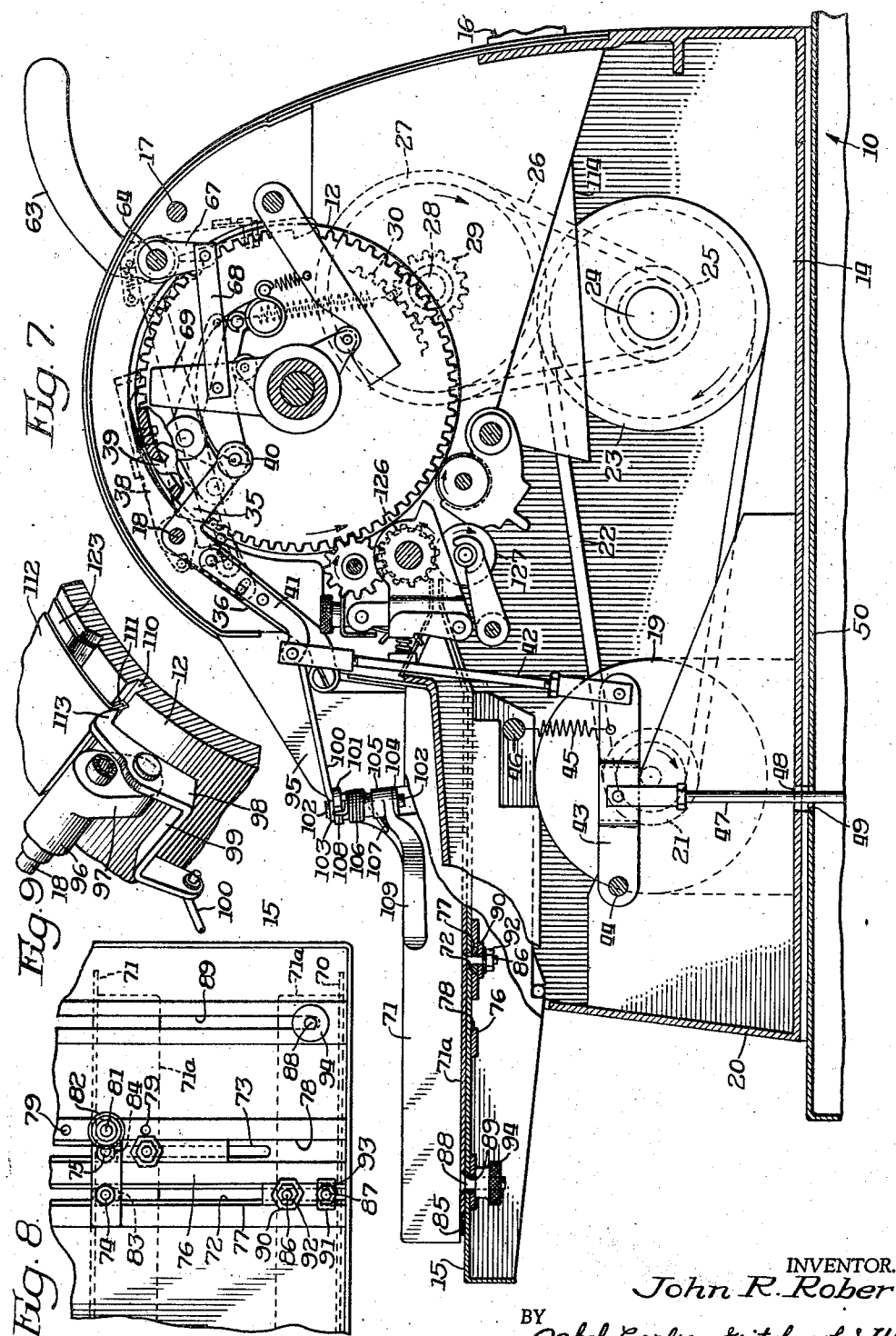
INVENTOR.
John R. Roberts
BY Zabel, Carlson, Fritzbaugh & Wells
Attys May 28, 1946.  J. R. ROBERTS  2,401,020
DUPLICATING MACHINE
Filed Aug. 21, 1942  7 Sheets-Sheet 6

INVENTOR.
John R. Roberts.
BY Zabel, Carlson, Fritzbaugh & Wells
Attys.

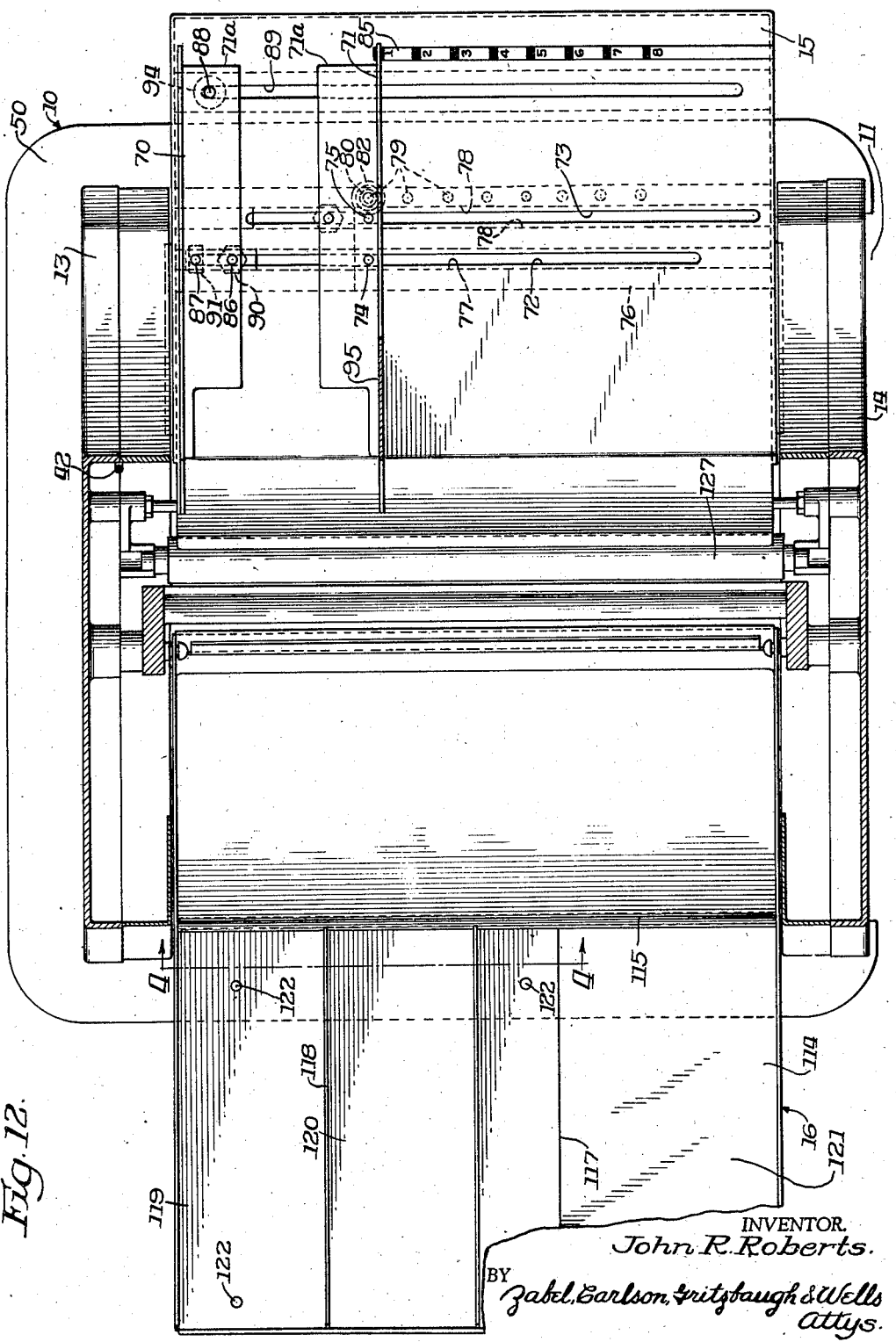

Patented May 28, 1946

2,401,020

UNITED STATES PATENT OFFICE 2,401,020

DUPLICATING MACHINE

John R. Roberts, Glenview, Ill., assignor to Ditto, Incorporated, Chicago, Ill., a corporation of West Virginia Application August 21, 1942, Serial No. 455,573

9 Claims. (Cl. 101—132)

The present invention relates to duplicating machines and is particularly directed to duplicating machines of the general type disclosed in the patent to Gibson, No. 2,277,967. It has for its purpose the provision of a novel combination of parts whereby an operator may make individual copies of segments of material found on the master copy sheet that is attached to the drum. In the use of duplicating apparatus of this type it is frequently desirable to place a multiplicity of items such as names and addresses upon a single master sheet. In making copies from this master sheet the operator usually does not desire very many copies of each item alone but it is essential that the few copies needed be made, and segregated as they are made, with as much speed as possible. An example of the type of operation to which I refer is the filling out of United States defense bonds and record forms and envelopes to go with said bonds. Where a number of people are buying bonds at about the same time a master sheet is prepared by typing the names and addresses of several bond purchasers on one side of the sheet while a hectograph carbon sheet is placed beneath the sheet. The under surface of the sheet thus receives the imprints of the names and addresses in reverse and becomes the active side of the master sheet. The bonds themselves are arranged in sets with their record cards so that there is attached to each bond two record cards, both of which must receive the same information that is imprinted upon the bond. Assuming that it is also desirable to address an envelope in which the bond is to be mailed, the operator would have to make four imprints of each name and address contained on the master sheet. A block-out sheet is commonly used to cover the portions of the master sheet that must be masked during the duplicating operation.

The operator however must feed the individual bonds and record cards and envelopes to the duplicating apparatus and when the several copies are made the record cards must be separated from the bond itself. Also, the making of the imprints on several bond sets from a particular master involves the shifting of the block-out sheet a necessary amount after each set of bond forms has been run through the machine.

My invention is embodied in a machine of the type above referred to and comprises means whereby the operator can feed the copies, to be printed upon, to the machine with one hand and segregate the printed copies as they leave the machine with the other hand, advancing the feeding guides and the block-out sheet as each new bond set is started through the duplicating machine and segregating the completed copies as they leave the duplicating drum. The arrangement is such that the duplicating apparatus discharges the printed copy where it can be readily seen and grasped by the operator, the feeding arrangement being such that it does not require visual inspection by the operator to determine whether the proper positioning of the feed tray guide and the block-out sheet have been made.

It is also a purpose of this invention to provide a novel arrangement of parts of a duplicating machine of the character described whereby to facilitate the operation of the machine by an operator seated alongside of it.

The invention has as a further object the provision of a novel means for receiving sheets from the duplicating drum. Also, it is a purpose of the invention to provide a novel means for simultaneously adjusting a feed tray guide and a block-out sheet that determine the position of a copy sheet and the matter to be duplicated thereon.

The features and advantages of the invention will appear more fully from the following description, reference being had to the accompanying drawings wherein a preferred form of the invention is shown. It should be understood however that the drawings and description are illustrative only and are not to be taken as limiting the invention except insofar as it is limited by the claims.

In the drawings:

Fig. 2 is an end view partly in section, taken on the line 2—2 of Fig. 1;

Fig. 3 is a plan view of the machine;

Fig. 4 is a sectional view taken on the line 4—4 of Fig. 2;

Fig. 5 is a fragmentary sectional view taken on the line 5—5 of Fig. 3;

Fig. 6 is a sectional view taken on the line 6—6 of Fig. 4;

Fig. 7 is an enlarged sectional view taken on the line 7—7 of Fig. 2;

Fig. 8 is a fragmentary sectional view taken on the line 8—8 of Fig. 4;

Fig. 9 is a fragmentary perspective view illustrating the block-out sheet advancing means;

Fig. 12 is an enlarged sectional view taken on the line 12—12 of Fig. 1.

Figure 10:
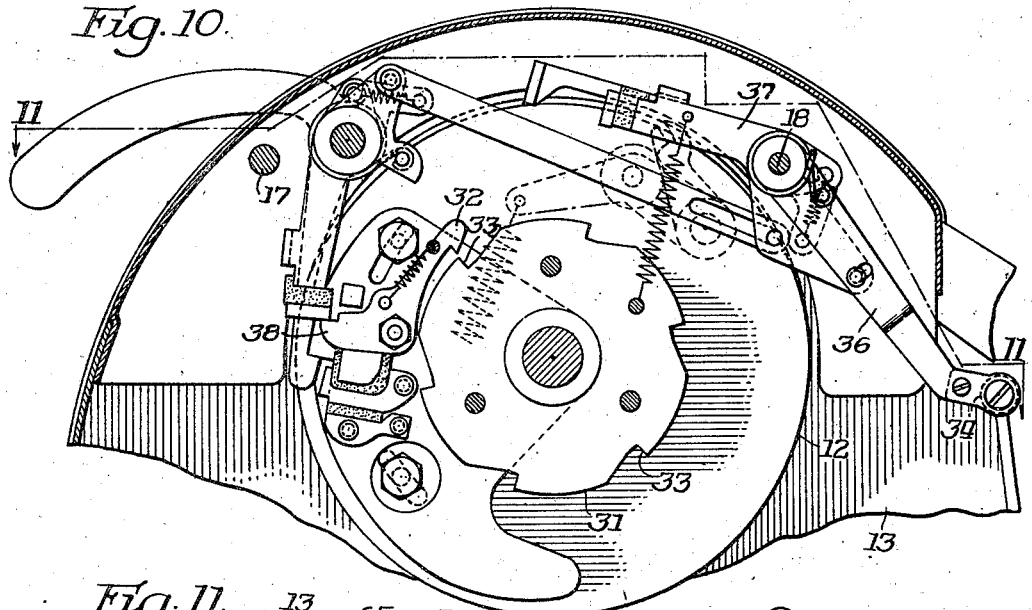
Fig. 10 is a sectional view taken on the line 10—10 of Fig. 2.

Referring now to the drawings, the present invention is embodied in a machine of the general type hereinbefore referred to. The machine comprises a stand 10 which is open at the side as indicated at 11 so that a person seated at the machine will be on the side shown in Fig. 1 of the drawings. The duplicating machine embodies a duplicating drum 12, two side frames 13 and 14, a feed tray 15 and a receiving tray 16. The two side frames are suitably connected together by cross rods such as 17 and 18 (see Fig. 11). A motor 19 (see Fig. 7) is supported on a base 20 located between the side frames and supplies the necessary power to operate the duplicating apparatus. The motor has a pulley 21 which drives a belt 22 that in turn drives a pulley 23 journaled on a shaft 24 carried by the side frame 14. A smaller pulley 25 is integral with the pulley 23 and serves to drive a belt 26 that in turn drives a pulley 27 which is journaled on a shaft 28 carried by the side frame 14. The pulley 27 is integral with a gear 29 which meshes with a main drive gear 30 for rotating the drum 12. The driving gear 30 has a clutch member 31 thereon and this clutch member is adapted to be connected to the drum by a pawl 32 carried on the drum and normally in engagement with one of the teeth 33 of the member 31 when the drum is being rotated. Suitable control means for disengaging the pawl 32 at the proper time are provided as described in the patent hereinbefore referred to. These control means are shown generally in Figs. 4 to 11, inclusive, but since they form no part of the present invention they will not be described in detail. The parts of the control means that are of importance to the present invention comprise a trip bar 34 which connects two operating levers 35 and 36. The lever 36 is connected to a pawl tripping and stopping mechanism 37 (see Fig. 10), which mechanism is adapted to engage a portion 38 of the pawl 32 as the drum rotates to release the pawl from the clutch member 31 and stop the drum in normal or home position.

A master sheet gripping means 39 is of course provided in the drum and the lever 35 carries a roller 40 which cooperates with the master sheet gripping control in the manner described in the patent hereinbefore mentioned.

The trip bar 34 provides a hand means for initiating operation of the duplicating drum but the lever 35 is also connected to a treadle mechanism by means of a bar 41 and a link 42. A lever arm 43 is pivoted to the side frame 13 by a pin 44 and the link 42 is connected to the free end of the arm 43. A spring 45 has one end connected to a pin 46 on the frame 13 and the other end connected to the arm 43 so as to tend to raise the arm. Intermediate its ends the lever arm 43 has a link 47 connected thereto. This link 47 extends downwardly through an opening 48 (see Fig. 2) in the bottom flange of the side frame 13 and downwardly through an opening 49 in the top flange 50 of the stand 10 where it connects with another lever arm 51 (see Figs. 1 and 2) that is fixed on a shaft 52 journaled in two bearings 53 and 54 that are carried on two angle irons 55 and 56 that are secured to the side walls of the stand 10. The lever arm 51 is of course fixed to the shaft 52 and another lever arm 57 is also fixed to the shaft adjacent the bearing 53. The free end of the lever arm 57 has a link 58 attached thereto.

Figure 1:
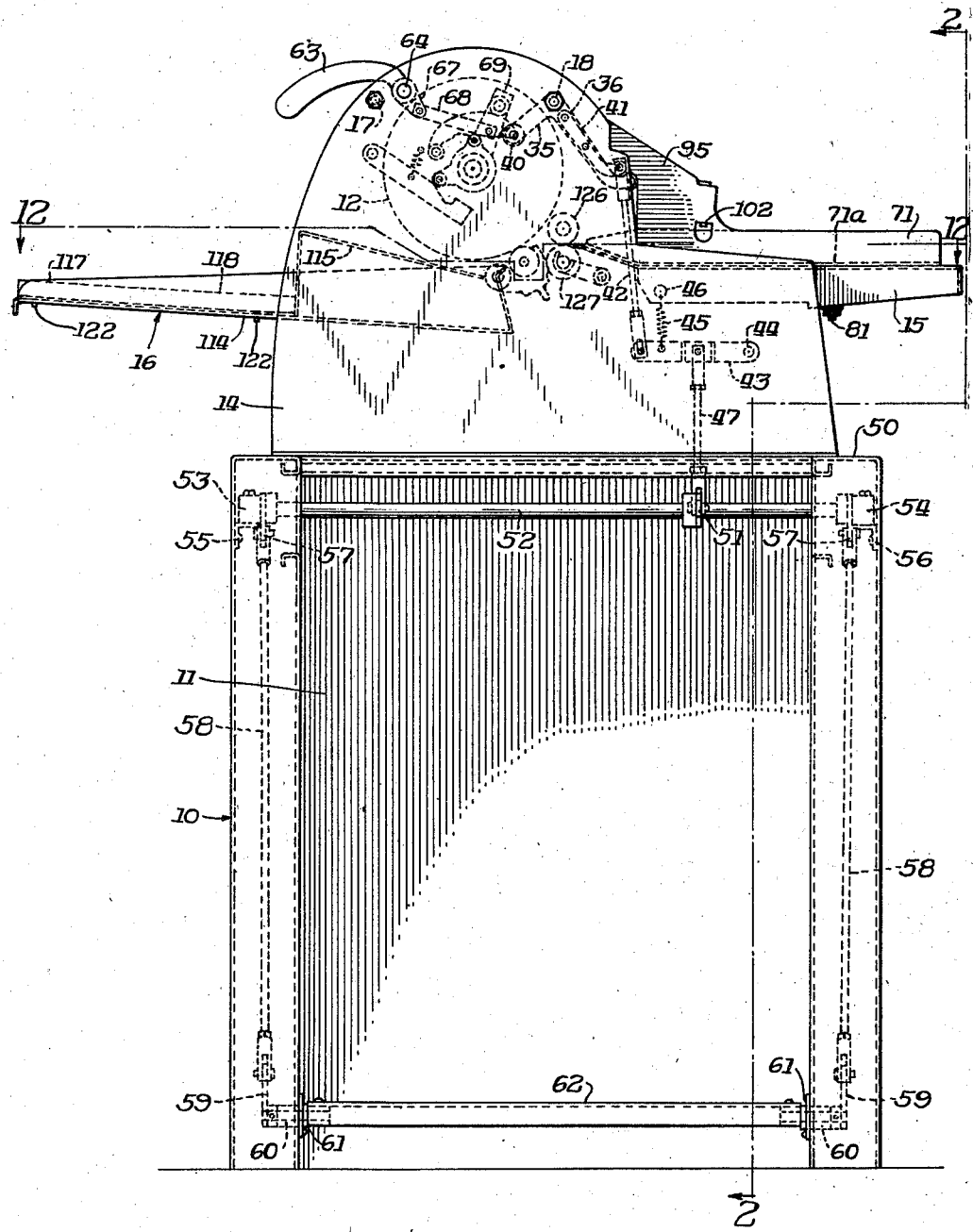
Fig. 1 is a view in side elevation of the duplicating apparatus embodying my invention, the machine being shown with the side thereof that is toward the operator in front.

This link extends downwardly and forwardly at the right-hand side of the stand as shown in Fig. 1 and is attached at its lower end to a lever arm 59 which is fixed on a shaft 60. The shaft 60 is journaled in a bearing 61 provided in one side frame of the stand 10 and extends through the inner wall of the side frame where it is affixed to a foot treadle 62. The other end of the foot treadle 62 is connected to a similar shaft journaled in the other side frame of the stand 10 and this shaft is connected by like legs and levers to the shaft 52.

It will be noted that the position of the duplicating drum and its control mechanism is such that a person sitting at the open side of the stand 10 so as to use the foot treadle 62 is positioned at the end of the drum that is nearest to the side frame 14. The operator thus is able to see the feed tray 15 and the receiving tray 16 as well as the top of the drum. In this machine as in the patent above referred to the control mechanism makes it possible to stop the drum with the master sheet gripping means 39 at the master release position which is the position shown in Fig. 4. In this position it is possible for the operator to observe the position of the block-out sheet and to reach the feed tray, the receiving tray and the block-out sheet without difficulty.

Figure 11:
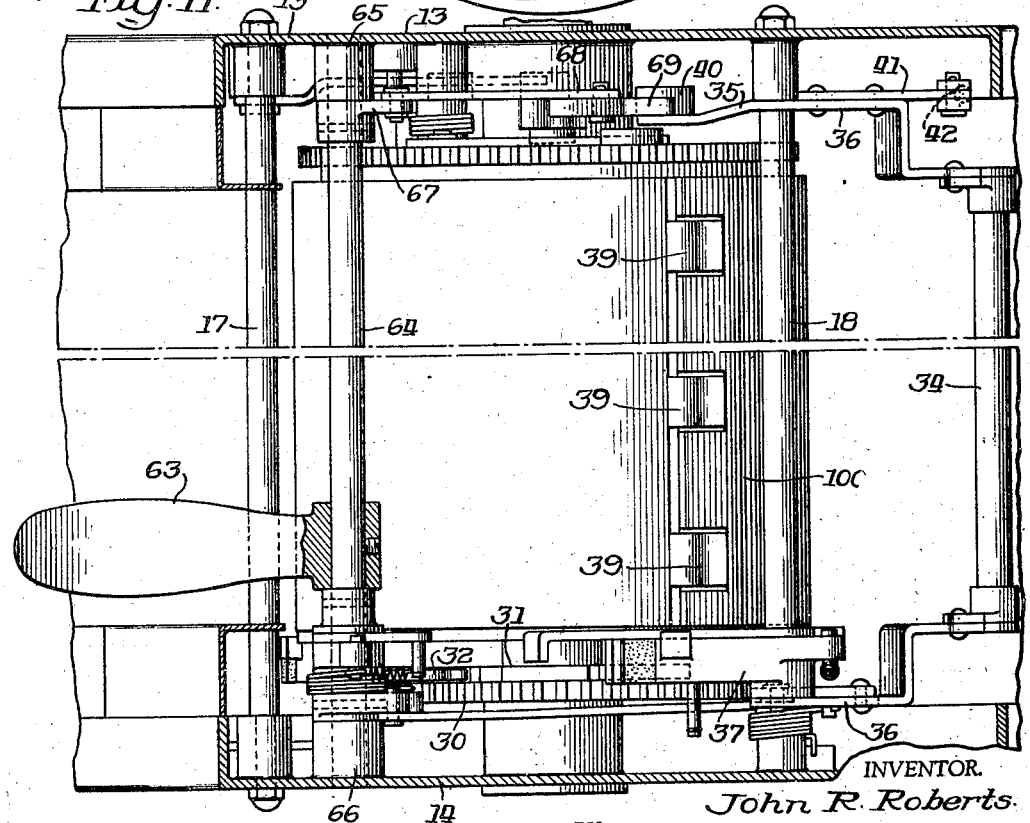
Fig. 11 is a sectional view taken on the line 11—11 of Fig. 10.

The master sheet release mechanism is operated by a lever 63 which is fixed on a shaft 64 that extends across the machine and is journaled in two bosses 65 and 66 in the side frames 13 and 14, respectively (see Fig. 11). As shown best in Fig. 7 the shaft 64 is connected by an arm 67 to a link 68 that is in turn connected to a lever arm 69 pivoted on the drum shaft. The lever arm 69 is adapted to operate the gripper opening mechanism for opening the master sheet grippers 39 as in the manner described in the patent hereinbefore mentioned. Since the details of this mechanism form no part of the present invention it is believed that further description thereof is unnecessary. It will be noted however that the lever 63 is positioned at the end of the shaft 64 closest to the operator (see Fig. 11) so that it is readily accessible to the operator.

Referring now to the feed tray 15, this feed tray is shown as provided with a relatively fixed side guide 70 located at the side of the feed tray closest to the side frame 13. A movable side guide 71 is mounted on the feed tray for movement toward and away from the side guide 70. Each side guide comprises a strip of metal bent to provide a horizontal portion 71a in addition to the upstanding guide portion 70 or 71. The bottom of the feed tray 15 is provided with two narrow transversely running slots 72 and 73. A portion 71a of the side guide 71 has two threaded pins 74 and 75, the pin 74 passing through the slot 72 and the pin 75 passing through the slot 73. These pins, as shown best in Fig. 4, are provided with heads that are fastened in the horizontal portion 71a by welding or other suitable means. Directly beneath the slots 72 and 73 the feed tray is reinforced by a plate 76 which is also provided with slots as indicated at 77 and 78 corresponding to the slots 72 and 73. The plate 76 has a series of conical recesses 79 in the lower surface thereof, these recesses being arranged in a row alongside the slot 78. The recesses serve as stops to receive a conical head 80 on a spring pressed pin 81 that is mounted in a bracket 82, the bracket 82 being fastened to the pins 74 and 75. The pins 74 and 75 have collars 83 and 84 thereon, the collars being fixed and being of such size as to ride freely in the slots 77 and 78. The conical head 80 of the pin 81 makes it possible for the operator to move the side guide 71 longitudinally along the plate 76 to adjust the spacing between the side guide 71 and the side guide 70. Each time the head 80 snaps into one of the recesses 79 it indicates to the operator that a movement of the guide 71 a definite distance has taken place. As a further check a visual indicator strip 85 is mounted on top of the feed tray adjacent the end of the side guide 71 and this indicator strip is provided with numbered markings corresponding to the recesses 79.

The side guide 70 may also be adjusted if desired since it is provided with two pins 86 and 87 adapted to ride in the slot 72 and a third pin 88 that rides in a slot 89 provided in the feed tray 15. The pins 86 and 87 have nuts 90 and 91 threaded thereon and lock nuts 92 and 93 holding them in place. The nuts 90 and 91 however are not drawn so tightly but that it is possible to slide the side guide 70. In order to lock the side guide 70 in position a knurled nut 94 is provided on the pin 88.

The side guide 71 also carries means for moving a block-out sheet on the drum 12. The side guide 71 is provided with an upwardly and diagonally extending part 95 that is apertured to receive a bearing sleeve 96 (see Fig. 2) that slides upon the cross tie rod 18. The sleeve 96 has an ear 97 thereon to which is pivoted a lever arm 98, one end of which is offset as indicated at 99 and connected to a link 100. The link 100 is in turn connected to a lever arm 101 that is fastened on a shaft 102 carried by the side guide 71. The side guide has a projection 103 that is bent over to serve as a top mounting for the shaft 102. The lower end of the shaft 102 is pivoted in an ear 104 that is struck out of the side guide 71. A collar 105 is fixed on the shaft 102 to keep it from sliding downwardly through the ear 104. A spring 106 is coiled about the shaft 102, one end 107 of the spring bearing against the side guide 71 and the other end 108 of the spring bearing against the lever arm 101. A hand lever 109 formed on the collar 105 extends horizontally alongside the side guide 71 where it can be readily grasped by the operator at the same time that the operator is grasping the side guide 71 to move it.

The lever 98 extends over the drum 12 in position to engage a block-out sheet receiving slot 110 in the drum (see Fig. 9). This block-out sheet receiving slot 110 has magnetic means associated therewith adapted to attract and hold a magnetically attractable portion 111 of the block-out sheet 112. A finger 113 is provided on the free end of the lever 98 to engage in the slot 110. Normally the spring 106 biases the lever 98 by means of the arm 101 and the link 100 in such a direction as to hold the finger 113 out of the slot 110 so as not to interfere with the rotation of the drum. However, when the drum is stopped in master sheet release position (the position shown in Fig. 4) the finger 113 can be lowered into the slot 110 by pressure on the hand lever 109 so that the block-out sheet will be moved lengthwise of the slot by the finger 113 at the same time and for the same distance as the side guide 71. It is thus possible by a single operation by the operator to adjust the block-out sheet 112 and the side guide 71.

Referring now to the receiving tray 16, this tray, as shown best in Figs. 4, 5 and 12, comprises a main tray portion 114 upon which there is arranged a removable ledge or shelf 115. The shelf 115 extends transversely of the tray 16 throughout its entire width and extends beneath the drum 12 so as to catch the sheets as they leave the drum. A copy sheet 116 is shown in Fig. 4 in the position it will occupy when released by the drum and laid on the shelf 115. It will be noted that the shelf is so narrow that the sheet 116 extends beyond the edge of the shelf a short distance where it can be readily grasped by the operator. To the left of the shelf 115 there is also provided an insert 117 on the tray 16 and this insert is provided with partitions 118 running lengthwise of the tray and spaced transversely of the tray so that the sheets 116 can be segregated between the partitions 118. This is particularly advantageous where the sheets 116 comprise cards that are relatively narrow and other portions that are wide. As shown best in Fig. 3, there are two narrow receiving portions 119 and 120 and one wide receiving portion 121 provided by the partitions 118 and the side edges of the tray 16. Any suitable means such as small pins 122 (see Fig. 4) may be provided on the member 117 for positioning the member 117 with respect to the tray 16.

In order that the operation of the present device may be readily understood let us assume that a master sheet 123 is attached to the drum 12 (see Fig. 3) and that a block-out sheet 112 having a window 124 is used to expose various sections 125 of information provided on the master sheet 123. The operator, in making copies such as 116, adjusts the side guide 71 and simultaneously therewith the block-out sheet 112 (the magnetic means for holding the block-out sheet permits it to slide lengthwise of the slot 110 with little difficulty but holds it with sufficient strength to prevent the block-out sheet from becoming displaced in the normal duplicating operation). It is only necessary then to hold the copy sheet against the side guide 71 and slide it into engagement with the combined feeding and moistening rolls 126 and 127 (see Fig. 4) of the duplicating machine in order to have the copies properly aligned to receive the imprint of the exposed section 125 of the master sheet 123. As the copies leave the drum 112 they slide out on the shelf 115 where they are visible to the operator so that he may grasp the free end of the copy sheet and deposit it in one of the receiving portions 119, 120 and 121. When the desired number of copies have been made of this particular section of the master sheet the operator grasps the side guide 71 and the hand lever 109 to advance the side guide toward him and at the same time to move the block-out sheet 112 toward him so as to expose another section of the master sheet.

From the foregoing description it is believed that the operation and advantages of the device hereinbefore described will be apparent to those skilled in this art.

While there have been shown and described certain embodiments of the invention, it is to be understood that it is capable of many modifications. Changes, therefore, may be made without departing from the scope of the invention as described in the appended claims, in which it is the intention to claim all novelty inherent in the invention as broadly as possible, in view of the prior art.

I claim:

1. A duplicating apparatus of the character described, comprising a hollow base open at one side, a framework mounted on top of said base, a duplicating drum having means for holding a master copy thereon, said drum being rotatably mounted in said framework with one end thereof facing in the same direction as said open side of the base, foot treadle means in said base for starting and stopping said drum, a feed tray at one side of said drum having a relatively fixed side guide at the edge thereof remote from the open side of the base and a step by step adjustable side guide movable from a point adjacent to the first named side guide toward the side of the feed tray closest to the open side of said base, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum.

2. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum.

3. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a lever, a rod on the framework supporting said lever for pivotal movement in a plane transverse to the axes of the drum, said lever being slidable lengthwise of the rod, and a finger on the lever for engaging and moving a block-out sheet mounted on the drum.

4. A duplicating apparatus of the character described, comprising a hollow base open at one side, a framework mounted on top of said base, a duplicating drum having means for holding a master copy thereon, said drum being rotatably mounted in said framework with one end thereof facing in the same direction as said open side of the base, foot treadle means in said base for starting and stopping said drum, a feed tray at one side of said drum having a relatively fixed side guide at the edge thereof remote from the open side of the base and a step by step adjustable side guide movable from a point adjacent to the first named side guide toward the side of the feed tray closest to the open side of said base, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a lever, a rod on the framework supporting said lever for pivotal movement in a plane transverse to the axes of the drum, said lever being slidable lengthwise of the rod, and a finger on the lever for engaging and moving a block-out sheet mounted on the drum.

5. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a lever, a rod on the framework supporting said lever for pivotal movement in a plane transverse to the axes of the drum, means on the side guide for turning the lever on said rod, said lever being slidable lengthwise of the rod, and a finger on the lever for engaging and moving a block-out sheet mounted on the drum.

6. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a lever, a rod on the framework supporting said lever for pivotal movement in a plane transverse to the axes of the drum, said lever being slidable lengthwise of the rod, said side guide being connected to said lever whereby to move the lever lengthwise of the rod when the side guide is moved, and a finger on the lever for engaging and moving a block-out sheet mounted on the drum.

7. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a bearing member secured to said side guide, a lever pivoted on said bearing member, a finger on said lever movable into and out of position to engage a block-out sheet on the drum, and means on the side guide operably connected to the lever for moving the lever and finger into operative position.

8. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a bearing member secured to said side guide, a lever pivoted on said bearing member, a finger on said lever movable into and out of position to engage a block-out sheet on the drum, and means on the side guide operably connected to the lever for moving the lever and finger into operative position, said last named means comprising a hand lever pivoted on the side guide, and a link connecting the hand lever with the finger operating lever.

9. In a duplicating apparatus, a framework, a duplicating drum rotatably journaled therein, means to rotate said drum, said drum having means for holding a master sheet thereon, a copy sheet feed tray adjacent to said drum, an adjustable side guide on said tray movable lengthwise of the drum, said drum having a block-out sheet holding means therein in which a block-out sheet may be moved lengthwise of the drum without releasing the sheet, and manually operable means connected with the adjustable side guide for correspondingly moving the block-out sheet when the adjustable side guide is moved lengthwise of the drum, said manually operable means comprising a bearing member secured to said side guide, a lever pivoted on said bearing member, a finger on said lever movable into and out of position to engage a block-out sheet on the drum, and means on the side guide operably connected to the lever for moving the lever and finger into operative position, said last named means comprising a hand lever pivoted on the side guide, a link connecting the hand lever with the finger operating lever, and spring means holding said finger normally away from the drum.

JOHN R. ROBERTS.